(12) United States Patent
Isfort

(10) Patent No.: US 8,348,001 B2
(45) Date of Patent: Jan. 8, 2013

(54) AGRICULTURAL HARVESTING MACHINE

(75) Inventor: Heinrich Isfort, Duelmen (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 779 days.

(21) Appl. No.: 12/490,698

(22) Filed: Jun. 24, 2009

(65) Prior Publication Data

US 2010/0011730 A1    Jan. 21, 2010

(30) Foreign Application Priority Data

Jul. 15, 2008    (DE) .................. 10 2008 033 067

(51) Int. Cl.
- *A01D 41/12*    (2006.01)
- *B62D 49/06*    (2006.01)
- *B62D 55/04*    (2006.01)

(52) U.S. Cl. ...... 180/209; 56/14.7; 280/149.2; 280/638; 296/26.09; 296/193.03; 460/119; 180/9.21; 180/9.26

(58) Field of Classification Search .......... 180/209, 180/9.21, 9.26; 280/149.2, 638; 56/1, 14.7, 56/14.8; 460/20, 119; 414/474, 475; 296/193.01, 296/193.03, 193.04, 26.01, 26.08, 26.09
See application file for complete search history.

(56) References Cited

U.S. PATENT DOCUMENTS

| | | | | |
|---|---|---|---|---|
| 3,212,810 A * | 10/1965 | Bass | ............................. | 296/171 |
| 3,483,680 A * | 12/1969 | Noack | ............................. | 56/10.8 |
| 4,033,101 A * | 7/1977 | Fritz et al. | ........................ | 56/344 |
| 4,232,775 A * | 11/1980 | Duncan | ........................... | 198/304 |
| 4,611,683 A * | 9/1986 | Hilmer | ............................ | 180/209 |
| 4,639,008 A * | 1/1987 | Krettenauer et al. | ....... | 280/405.1 |
| 5,368,121 A * | 11/1994 | Priefert | .......................... | 180/209 |
| 5,901,800 A * | 5/1999 | Wilson et al. | ................. | 180/9.48 |
| 5,904,365 A * | 5/1999 | Dillon | ............................ | 280/419 |
| 6,125,618 A * | 10/2000 | Dillon | ............................ | 56/14.6 |
| 7,780,197 B2 * | 8/2010 | White | ............................ | 280/781 |
| 2003/0228894 A1 * | 12/2003 | Covington et al. | ........... | 460/119 |
| 2004/0255563 A1 | 12/2004 | Schafer | | |
| 2005/0189730 A1 * | 9/2005 | White | ......................... | 280/6.154 |

FOREIGN PATENT DOCUMENTS

| | | | |
|---|---|---|---|
| DE | 4220438 A1 | * | 12/1993 |
| DE | 103 27 478 | | 2/2005 |

OTHER PUBLICATIONS

Definition: Telescopic, American Heritage Dictionary of the English Language available through Yahoo.com at http://education.yahoo.com/reference/dictionary/entry/telescopic (last visited on Jun. 14, 2012).*

* cited by examiner

*Primary Examiner* — Joseph Rocca
(74) *Attorney, Agent, or Firm* — Michael J. Striker

(57) ABSTRACT

An agricultural harvesting machine, in particular a self-propelled forage harvester, has a body which includes frame parts and parts of the outer shell, a chassis having at least two drive axles which form the ground drive, and various working units and drive units, and the harvesting machine is separatable into at least one front module and one rear module which are displaceable relative to one another.

17 Claims, 3 Drawing Sheets

AGRICULTURAL HARVESTING MACHINE

CROSS-REFERENCE TO RELATED APPLICATION

The invention described and claimed hereinbelow is also described in German Patent Application DE 10 2008 033 067.1 filed on Jul. 15, 2008. This German Patent Application, whose subject matter is incorporated here by reference, provides the basis for a claim of priority of invention under 35 U.S.C. 119(a)-(d).

BACKGROUND OF THE INVENTION

The present invention relates to an agricultural harvesting machine.

Increasingly larger and heavier harvesting machines are being used in modern agriculture. Harvesting machines in particular such as forage harvesters or combine harvesters having large front attachments compress the ground to a considerable extent. The ground compression is dependent in particular on the weight (mass) of the front harvesting attachment and on the ballast weight that may be attached to the rear; the ballast weight, in turn, is dependent on the weight of the front harvesting attachment. Attempts have been made for a long period of time to counteract the considerable ground compression that occurs by using wheels having the largest possible volume, or by using track roller units and greater wheel separation.

From DE 103 27 478 A it is known to equip a self-propelled harvesting machine with a device that may be used to vary the distance between the wheels in order to realize an adjusted distribution of weight onto the drive axles, which makes it possible to adapt to the weight of the particular front attachment that is installed. The disadvantage of this solution is that, despite an increase in the wheel separation that exists when larger track roller units are used, the problem arises—on the front drive axle in particular—of installing the track roller unit without having to access the structure of the working units installed at the front, since the wheel housings that are present on series-production harvesting machines are often not designed to accommodate larger track roller units, due to the space available in the longitudinal direction toward the front harvest attachment that is installed, which is the case with forage harvesters in particular.

SUMMARY OF THE INVENTION

The object of the present invention, therefore, is to develop an agricultural harvesting machine in a manner such that the disadvantages mentioned in the related art are avoided, and, in particular, the possibility is created of obtaining a weight distribution that is adapted to the weight of a front attachment that is installed, which also makes it possible to use larger track roller units on the front drive axle in particular in order to reduce ground compression.

In keeping with these objects and with others which will become apparent hereinafter, one feature of the present invention resides, briefly stated, in an agricultural harvesting machine, comprising a body including frame parts and parts of an outer cladding; a chassis having at least two drive axles which form a ground drive; working units; drive units, wherein the harvesting machine is separable into at least one front module and at least one rear module which are displaceable relative to one another.

Given that the harvesting machine is separable into at least one front module and at least one rear module (B, C), and given that the at least one front module and the at least one rear module are displaceable relative to one another, an improved weight distribution onto the ground drives of the harvesting machine is advantageously attained, thereby making it possible to use heavy front attachments while simultaneously reducing ground compression.

In an advantageous development of the present invention, the body and the chassis of the agricultural harvesting machine are changeable in terms of length in the region between the drive axles which form the ground drive, thereby making it possible—since the distance between the drive axles may be changed—to adapt the weight distribution to the weight of a front attachment that is installed, and, therefore making it possible in particular to use larger track roller units, thereby reducing the ground compression that takes place and advantageously preventing or reducing damage to crop material types that are harvested repeatedly, e.g. preventing or reducing damage to the turf.

In an advantageous development of the present invention, the change in length of the body and the chassis of the harvesting machine takes place without changing the design and/or functionality of the working units. This has the advantage that the crop material flow through the harvesting machine of a series-production harvesting machine may be retained.

In order to attain a length change in the simplest manner possible in order to improve the weight distribution of the harvesting machine, the body and the chassis of the harvesting machine have a parting plane in a region between the drive axles which form the ground drive. Particularly advantageously, no working units of the harvesting machine are situated in the region between the parting plane; as a result, little or no retrofitting work need be carried out on the working units in order to change the length.

In an advantageous embodiment of the present invention, body parts and chassis parts are installed between the front module and the rear module in order to change the length of the harvesting machine, thereby making it possible to change the length of the harvesting machine in a manner having a simple design, in order to attain a weight distribution that is adapted to the weight of a front harvesting attachment. In the simplest case, the body and chassis parts of the harvesting machine that are present in the region of the parting plane are replaced by extended body and chassis parts in order to change the length of the harvesting machine.

In an advantageous development of the present invention, at least one extension module may be inserted into the parting plane, thereby making it possible to change the length of the body and the chassis of the harvesting machine within a reasonable amount of time. The extension module is preferably telescopic in design so that the length of the harvesting machine may be changed in a variable manner. Given that the extension module includes preinstalled body parts and parts of the chassis, and it forms a single assembly unit, it is possible to attain an uncomplicated length extension of the harvesting machine and, therefore, a weight distribution that is rapidly adapted to the particular front attachment that is installed.

Appropriate means for attaching the extension module are advantageously present in the region of the parting plane in order to ensure adequate stability of the harvesting machine. In the simplest case, the extension module is attached to the front module and the rear module using threaded connections which are known per se.

Given that the body includes the frame parts, and parts of the outer cladding of the harvesting machine, and that the chassis is designed to be telescopic in the longitudinal direction of the vehicle in the region of the parting plane, it is possible to extend the length of the harvesting machine without using an inserted extension module. Advantageously, adjusting elements are provided that are designed to extend the length automatically and/or manually.

An advantageous embodiment of the harvesting machine according to the present invention includes hydraulic cylinders and/or electronic linear motors as the adjusting elements which are preferably situated parallel to the telescopable parts of the body and the chassis. In particular, the parallel configuration of the adjusting elements saves space and ensures that force is transmitted effectively.

Given that extending the length of the body and the chassis results in an extension of the wheel housing in which the front drive axle is accommodated, it is ensured that large track roller drives may also be installed in the longitudinal direction of the vehicle without the need to perform retrofitting work on working units situated in the front region of the harvesting machine, thereby making it advantageously possible to prevent ground compression even when a heavy front harvesting attachment is used.

In a further advantageous embodiment of the present invention, a tensioning element is assigned to a drive belt that establishes the operative connection between the drive units and the working units, thereby making it possible to tension the drive belt as required for the length extension of the body and the chassis of the harvesting machine, thereby enabling the drive belt to transfer high torque and, therefore, drive output to the working units even when the length of the harvesting machine has been extended.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
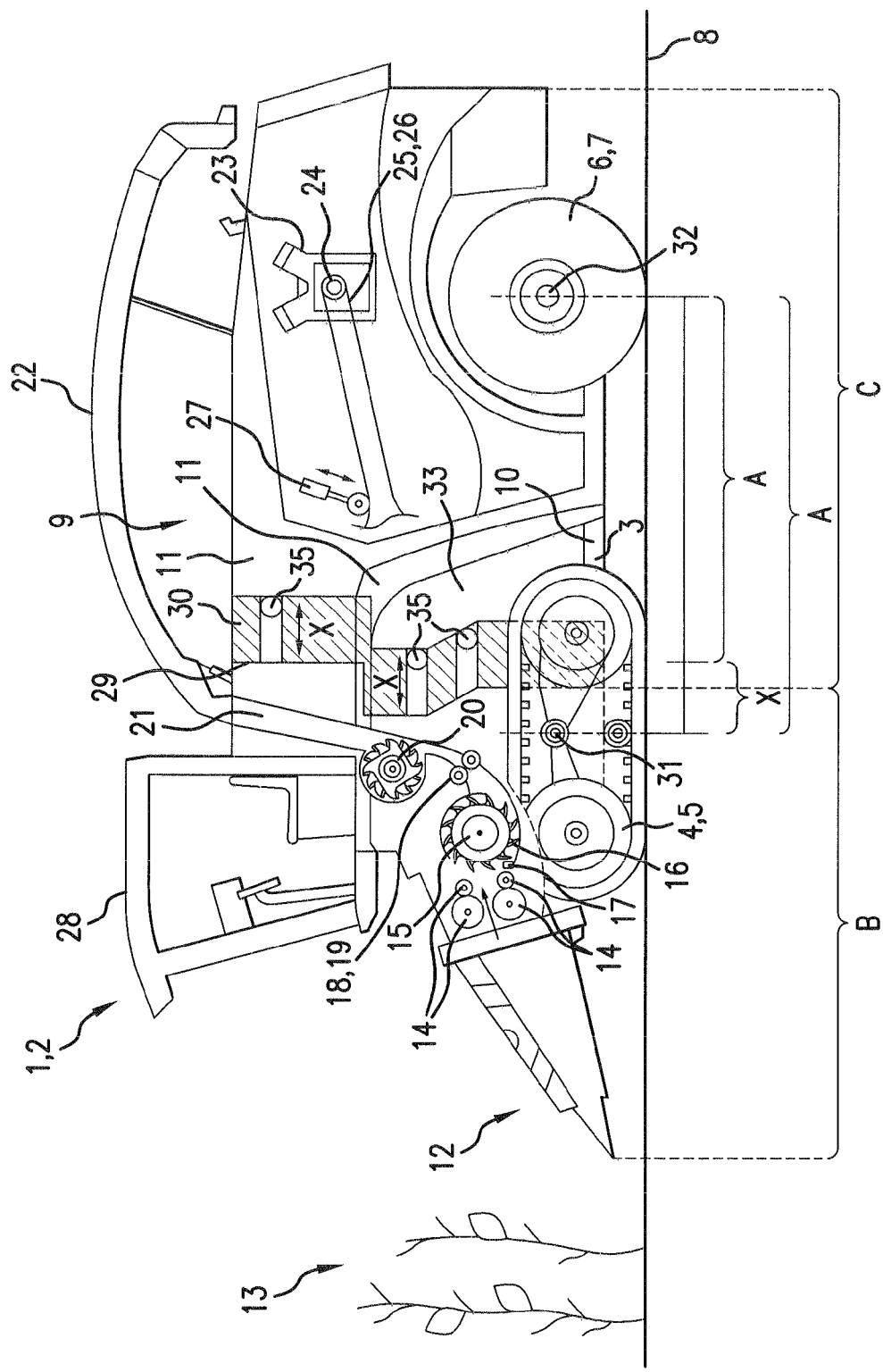
FIG. 1 shows a schematic side view of a self-propelled harvesting machine in the form of a self-propelled forage harvester that includes an extension module.

FIG. 1 shows an agricultural harvesting machine 2 that is designed as a self-propelled forage harvester 1. Harvesting machine 2 is built on a chassis 3 which is supported on ground 8 by a front ground drive 4 designed as a track roller unit 5, and by a rear ground drive 6 in the form of wheels 7. Chassis 3 supports the working units and drive units, which will be described in greater detail, and body 9 includes frame parts 10 and parts of outer cladding 11 of harvesting machine 2. A front harvesting attachment 12 is mounted in the front region of harvesting machine 2. Front harvesting attachment 12 is detachably mounted on front harvesting machine 2, and it may be replaced by other front harvesting attachments. Crop material 13 that is picked up using front harvesting attachment 12, e.g. corn, grass, or other types of crop material, is drawn via compression rollers 14 into harvesting machine 2, and is conveyed to a chopper drum 15. Chopper drum 15 includes a large number of chopping blades 16 on its circumference, which, in interaction with a shear bar 17, fragmentize crop material 13 that is drawn into harvesting machine 2. Via the kinetic energy of rotating chopper drum 15, fragmentized crop material 13 exits the rear region of chopper drum 15 at a high rate of speed and is transferred to cracker rollers 18 which are present in pairs.

Cracker rollers 18 form a post-fragmentation device 19. After crop material 13 has passed through post-fragmentation device 19, it reaches the effective region of a post-accelerator 20. Post-accelerator 20 adds kinetic energy to crop material 13 in a manner known per se, via which crop material 13 is ejected out of forage harvester 1 via a lower discharge chute 21 which points in the vertical direction and via an upper discharge chute 22 which is located downstream of lower discharge chute 21 and is movable in a swiveling and rotating manner. In the embodiment shown, front harvesting attachment 12, intake conveyor mechanisms 14, chopper drum 15, post-fragmentation device 19, and post-accelerator 20 are the working units of forage harvester 2.

In addition, at least one drive engine 23 is assigned to forage harvester 1; a drive belt 25 is wrapped around output-side pulley 24 of drive engine 23. Drive belt 25 is used as main drive belt 26 and is operatively connected—in a manner which is known per se and is not explained here in greater detail—to the drive units of harvesting machine 2. A tensioning element 27 is assigned to drive belt 25 in a manner to be described in greater detail, below. In the embodiment, drive engine 23 is the working unit. Harvesting machine 2 is operated from within a driver's cab 28, from which front harvesting attachment 12 is visible.

In the case of agricultural harvesting machines 2, the load on ground drive 6, such as wheels 7 or track roller drive 5, and, therefore, the ground compression is dependent to a considerable extent on the weight of a front harvesting attachment 12 that is installed, and on a ballast weight that may be installed and which is not depicted here. In the case of relative heavy front harvesting attachments 12, an appropriate ballast weight must therefore be installed at the rear of harvesting machine 12, which, in turn, increases the overall weight of harvesting machine 2 and results in greater ground compression.

In a manner according to the present invention, harvesting machine 2 is separable into at least one front module B and into at least one rear module C, front and rear modules B, C being displaceable relative to one another. Separation into several modules is within the scope of the present invention. In the embodiment, the length of body 9 and chassis 3 of agricultural harvesting machine 2 is changeable in a region between drive axles 31, 32 which form ground drive 4, 6, thereby resulting in a weight distribution onto ground drives 4, 6 that is adapted to the weight of a front harvesting attachment 12 that is installed. In the embodiment, an extension module 30 is installed between front module B and rear module C of harvesting machine 2 in the region of a parting plane 29, thereby extending harvesting machine 2 overall by distance X. Detachable fixing means which, in the simplest case, are threaded connections which are known per se and which are not depicted here in greater detail are situated along parting plane 29 which extends around the circumference of harvesting machine 2; when the fixing means are loosened, harvesting machine 2 is separable along parting plane 29 into a front module B and a rear module C.

In an advantageous embodiment of the present invention, body parts 11 and chassis parts 10 are inserted between front module B and rear module B in order to change the length of harvesting machine 2, thereby making it possible to change the length of harvesting machine 2 in a manner having a simple design, in order to attain a weight distribution that is adapted to the weight of a front harvesting attachment 12. It is also feasible to replace body parts 11 and chassis parts 10 of harvesting machine 2 that are present in the region of parting plane 29 by extended body parts 10 and chassis parts 11 in order to change the length of harvesting machine 2.

Advantageously, parting plane 29 is situated in a region of harvesting machine 2 that contains none of the working units of harvesting machine 2 mentioned above, thereby making it possible to extend the harvesting machine without the need to perform costly retrofitting work on the working units. This has the advantage that the design and functionality of the working units remain unchanged, so that the flow of crop material through harvesting machine 2 corresponds to that of a series-production harvesting machine. Hose lines that are not depicted here but which are situated in the region of parting plane 29 are replaced by hose lines that are long enough for the length extension, or hose lines are already present that are of variable length, and that may be adapted to the change in length of harvesting machine 2.

By inserting extension module 30 which preferably includes preinstalled frame parts 10 and parts of outer cladding 11 of harvesting machine 2, distance A between front and rear drive axles 31, 32 is changable by distance X to become distance A' in order to attain an improved weight distribution of harvesting machine 2 and, therefore, reduced ground compression, in accordance with the weight of front harvesting attachment 12 that is installed. Fixing elements that are not depicted here and that make it possible to rapidly insert extension module 30 are provided in order to attach extension module 30. It is also feasible for the attachment to be realized using a threaded connection which is known per se. In an advantageous development of the present invention, inserting an extension module 30 also results in an extension of wheel housing 33 which accommodates front drive axle 31.

By extending wheel housing 33, the possibility is advantageously created of installing a large track roller unit 5 as shown in the embodiment on front drive axle 31 without the need to perform retrofitting work on the working units described above, thereby resulting in a greater ground contact area and therefore reducing the ground compression given that a larger track roller drive 5 is used. In the case in which track roller drives 5 are used that are larger in the longitudinal direction of the vehicle in particular, it is therefore possible to prevent the need to perform cost-intensive retrofitting work on the working units situated in front module B, which would otherwise make it difficult to install large track roller drives 5. The flow of crop material through harvesting machine 2 therefore remains unchanged.

An optimal guidance of main drive belt 26 which establishes the operative connection between drive engine 23 and the working units mentioned above is given when the length of harvesting machine 2 is changed when, as shown in FIG. 1, a tensioning element 27 is assigned to main belt drive 26. With the aim of transferring high drive energies and ensuring a reliable form-fit guidance of main drive belt 26, tensioning element 27 is designed such that it includes an idler pulley which is not depicted here, which tensions main drive belt 26 when pressure is applied to it or released from it, thereby ensuring that main drive belt 26 may be tensioned sufficiently as required in accordance with the change in length of harvesting machine 2, thereby ensuring that, if the length of harvesting machine 2 is changed, main drive belt 26 may transmit a high torque and, therefore, high drive output to the working units that are situated in front module B.

Figure 2:
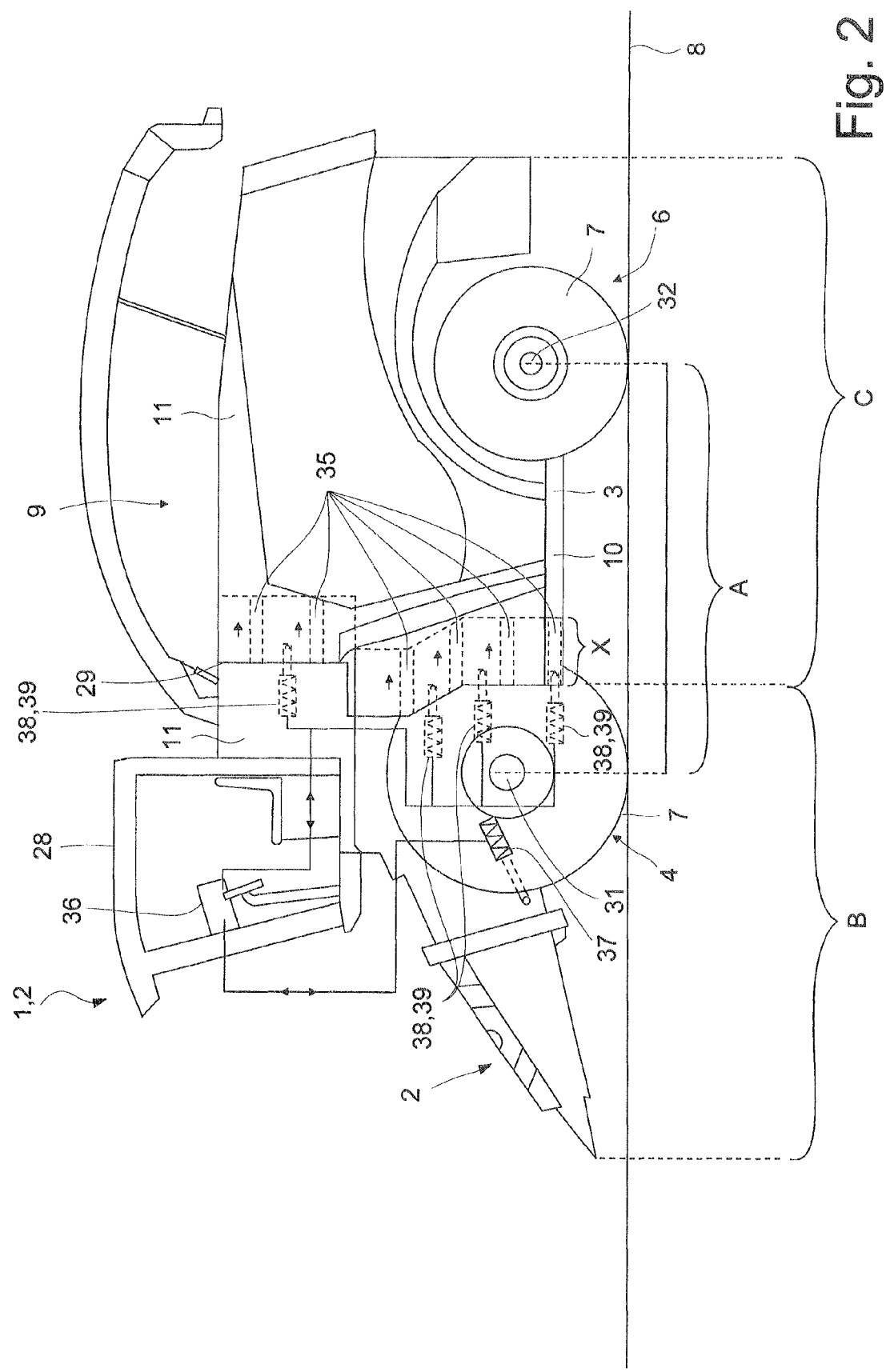
FIG. 2 shows a schematic side view of a self-propelled harvesting machine in the form of a self-propelled forage harvester as in FIG. 1.

An advantageous embodiment of the present invention is shown in FIG. 2. As in FIG. 1, agricultural harvesting machine 2 which is designed as a self-propelled forage harvester 1 is built on a chassis 3 which is supported on ground 8 by a front ground drive 4 in the form of wheels 7, and by a rear ground drive 6 in the form of wheels 7. Chassis 3 supports the working units and drive units, which were described in greater detail with reference to FIG. 1 and are therefore not described here in greater detail, and body 9 includes frame parts 10 and parts of outer cladding 11 of harvesting machine 2. A front harvesting attachment 12 is mounted in the front region of harvesting machine 2. According to the present invention, a change of length of body 9 and chassis 3 of harvesting machine 2 may be brought about by using telescoping parts of chassis 3 and body 9 of harvesting machine 2. Harvesting machine 2 is shown in the non-extended state. Harvesting machine 2 includes—along a parting plane 29 that separates harvesting machine 2 into a front module B and a rear module C—body parts 10 around the circumference and parts of chassis 11 which are designed to be telescopable in the longitudinal direction of the vehicle as indicated using an arrow, in order to bring about a change in length of harvesting machine 2.

Figure 3:
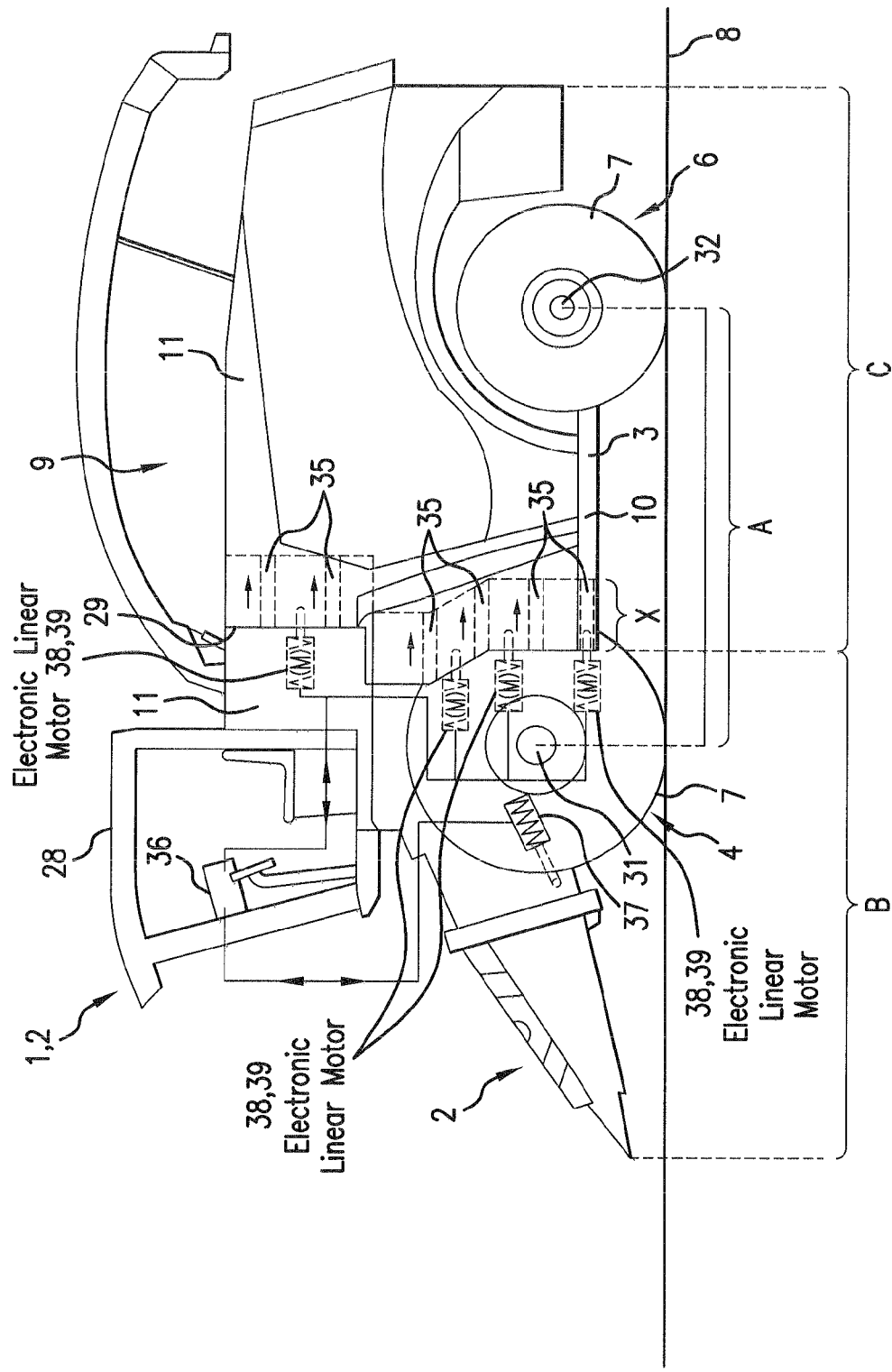
FIG. 3 shows a schematic side view of a self-propelled harvesting machine in the form of a self-propelled forage harvester as in FIG. 1, comprising electronic linear motors.

In order to attain adequate stability when rear module C is displaced relative to front module B of harvesting machine 2, guide elements 35 are provided in the region of parting plane 29, thereby making it possible using the telescoping capability of body 9 and chassis 3 to change wheel separation A between front drive axle 31 and rear drive axle 32 in a stepless manner within maximum distance value X, thereby making it possible to attain a weight distribution of harvesting machine 2 that is adapted to front harvesting attachment 12 that is installed. In order to realize the stepless change in length, adjusting elements 38 in the form of hydraulic cylinders 39 or electronic linear motors 39' are provided, which are preferably situated parallel to telescopable parts of body 9 and chassis 3, and which are connected thereto, as schematically shown in FIGS. 2 and 3 respectively. It is feasible for adjusting elements 38 to be connected to an operation and control unit 36, thereby making it possible to control the change in length of harvesting machine 2 from driver's cab 28.

It is also feasible for adjusting elements 38 to be designed to change distance A between drive axles 31, 32 which form ground drive 4, 6 depending on the weight of a front harvesting attachment 12 and/or a ballast weight which is not depicted here. Operation and control unit 36 is preferably connected to a front attachment weight sensor which is not depicted in greater detail, and which may be integratable in the hydraulic circuit of hydraulic cylinder 37 which is used to adjust the height of the front harvesting attachment. Based on the pressure that is present in the hydraulic circuit, it is possible to ascertain information about the weight of front harvesting attachment 12 that is installed, since a higher pressure is required to raise a heavy front harvesting attachment 12 than is required to raise a lighter-weight front harvesting attachment 12. As an alternative, a ballast weight (not depicted) situated at the rear of harvesting machine 12 may also be accounted for in the change of length.

It is within the scope of the ability of a person skilled in the art to modify the agricultural harvesting machine described herein in a manner not presented, in order to achieve the effects described, without leaving the scope of the present invention.

It will be understood that each of the elements described above, or two or more together, may also find a useful application in other types of constructions differing from the types described above.

While the invention has been illustrated and described as embodied in an agricultural harvesting machine in an overflow capture vessel in a tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

The invention claimed is:

1. An agricultural harvesting machine, comprising
a body including frame parts and parts of an outer cladding;
a chassis having at least two drive axles which form a ground drive;
working units; and
drive units;
wherein the harvesting machine is separable into at least one front module and at least one rear module which are displaceable relative to one another; and
wherein said body and said chassis are extendable so as to provide an extension of a wheel housing which accommodates a front ground drive.

2. The agricultural harvesting machine as defined in claim 1, wherein said body and said chassis are changeable in length in a region between said drive axles which form the ground drive.

3. The agricultural working machine as defined in claim 2, wherein said working units are configured so that at least one parameter selected from the group consisting of a design of the working units, a functionality of the working units, and both remains unchanged when the length is changed.

4. The agricultural harvesting machine as defined in claim 1, wherein said body and said chassis include a parting plane in a region between said drive axles which form said ground drive, for extending a length of the harvesting machine.

5. The agricultural harvesting machine as defined in claim 4, wherein parts of said body and parts of said chassis that are present in a region of said parting plane are replaced by extended body and chassis parts.

6. The agricultural harvesting machine as defined in claim 4, further comprising at least one extension module insertable between said front module and said rear module in a region of said parting plane.

7. The agricultural harvesting machine as defined in claim 6, wherein said at least one extension module is telescopable in a longitudinal direction of the vehicle.

8. The agricultural harvesting machine as defined in claim 6, wherein said at least one extension module includes parts of said body and parts of said chassis which are preinstalled.

9. The agricultural harvesting machine as defined in claim 6, wherein said body and said chassis include means for attaching said at least one extension module.

10. The agricultural harvesting machine as defined in claim 4, wherein said body and said chassis are telescopable in a longitudinal direction of the vehicle in a region of said parting plane.

11. The agricultural harvesting machine as defined in claim 4, wherein said body and said chassis include adjusting elements in a region of said parting plane, which are configured for bringing about an extension of a length of the harvesting machine in a manner selected from the group consisting of automatically, manually, and both.

12. The agricultural harvesting machine as defined in claim 11, wherein said adjusting elements are configured as elements selected from the group consisting of hydraulic cylinders, electronic linear motors, and both.

13. The agricultural harvesting machine as defined in claim 11, wherein said adjusting elements are configured to change a distance between said drive axles which form said ground drive, depending on a weight of a component selected from the group consisting of a front harvesting attachment, a ballast weight, and both.

14. The agricultural harvesting machine as defined in claim 1, wherein said parting plane extends through a region of the harvesting machine that contains no working units.

15. The agricultural harvesting machine as defined in claim 1, wherein parts of said body and parts of said chassis are installed between said front module and said rear module in order to change a length, with said parts of said body including said frame parts and said parts of said outer cladding.

16. The agricultural harvesting machine as defined in claim 1, wherein some of said working units are operatively connected to other of said working units via a drive belt, further comprising a tensioning element assigned to said drive belt.

17. The agricultural harvesting machine as defined in claim 1, wherein the agricultural housing machine is configured as a self-propelled forage harvester.

* * * * *